(12) United States Patent
Bette

(10) Patent No.: US 7,434,351 B2
(45) Date of Patent: Oct. 14, 2008

(54) NO MAINTENANCE LETHAL MOSQUITO BREEDING TRAP

(76) Inventor: James Robert Bette, 145 Biscayne Dr., Athens, GA (US) 30606

( * ) Notice: Subject to any disclaimer, the term of this patent is extended or adjusted under 35 U.S.C. 154(b) by 262 days.

(21) Appl. No.: 11/263,317

(22) Filed: Oct. 31, 2005

(65) Prior Publication Data

US 2006/0150473 A1     Jul. 13, 2006

Related U.S. Application Data

(60) Provisional application No. 60/646,123, filed on Jan. 11, 2005.

(51) Int. Cl.
*A01M 1/02* (2006.01)
*A01M 1/20* (2006.01)
*A01M 1/10* (2006.01)

(52) U.S. Cl. .......................... 43/107; 43/131

(58) Field of Classification Search ............ 43/107, 43/132.1, 131
See application file for complete search history.

(56) References Cited

U.S. PATENT DOCUMENTS

| | | | | | |
|---|---|---|---|---|---|
| 1,823,892 | A | * | 9/1931 | Galbraith | 43/112 |
| 3,772,820 | A | * | 11/1973 | Bond | 43/131 |
| 3,997,999 | A | * | 12/1976 | Evans | 43/107 |
| 4,002,146 | A | * | 1/1977 | Neff | 119/51.04 |
| 4,019,459 | A | * | 4/1977 | Neff | 119/51.04 |
| 4,218,843 | A | * | 8/1980 | Clarke, Jr. | 43/131 |
| 4,328,636 | A | * | 5/1982 | Johnson | 43/107 |
| 4,631,857 | A | * | 12/1986 | Kase et al. | 43/132.1 |
| 5,123,201 | A | * | 6/1992 | Reiter | 43/107 |
| 5,241,779 | A | * | 9/1993 | Lee | 43/139 |
| 5,749,168 | A | * | 5/1998 | Chrysanthis | 43/131 |
| 5,815,980 | A | * | 10/1998 | Clarke, Jr. | 43/113 |
| 5,819,685 | A | * | 10/1998 | Kappelt et al. | 119/6.5 |
| 5,896,697 | A | * | 4/1999 | Kang | 43/107 |
| 5,921,018 | A | * | 7/1999 | Hirose et al. | 43/132.1 |
| 5,983,557 | A | * | 11/1999 | Perich et al. | 43/107 |
| 6,014,834 | A | * | 1/2000 | Ferland | 43/131 |
| 6,023,884 | A | * | 2/2000 | Yanohara | 43/132.1 |
| 6,112,453 | A | * | 9/2000 | Clarke, Jr. | 43/113 |
| 6,145,242 | A | * | 11/2000 | Simpson | 43/131 |
| 6,185,861 | B1 | * | 2/2001 | Perich et al. | 43/107 |
| 6,219,961 | B1 | * | 4/2001 | Ballard et al. | 43/131 |
| 6,338,220 | B1 | * | 1/2002 | Dicks | 43/132.1 |
| 6,374,536 | B1 | * | 4/2002 | Washburn | 43/132.1 |
| 6,389,740 | B2 | * | 5/2002 | Perich et al. | 43/131 |
| 6,401,384 | B1 | * | 6/2002 | Contadini et al. | 43/132.1 |
| 6,497,070 | B1 | * | 12/2002 | Snell et al. | 43/131 |
| 6,516,559 | B1 | * | 2/2003 | Simchoni et al. | 43/107 |

(Continued)

FOREIGN PATENT DOCUMENTS

AU     9511632 A   *   8/1995

(Continued)

*Primary Examiner*—Darren W Ark

(57) ABSTRACT

A device into which gravid (pregnant) female mosquitos are attracted to deposit their eggs and where both the adult and her offspring are then eliminated. The trap is set in the out-of-doors at the onset of the mosquito breeding season and is replenished by rain water and, by its unique construction, a larvicide within is protected from flushing and photo degradation thereby making it maintenance free throughout the mosquito breeding season. The low cost trap is constructed from biodegradable paperboard and at the end of the mosquito breeding season, decomposes, thereby foreclosing the possibility that the trap will become a breeding incubator.

5 Claims, 4 Drawing Sheets

U.S. PATENT DOCUMENTS

| | | | |
|---|---|---|---|
| 6,543,180 B2 * | 4/2003 | Pace | 43/107 |
| 6,546,667 B1 * | 4/2003 | Carter | 43/107 |
| 6,618,984 B1 * | 9/2003 | Li | 43/107 |
| 6,651,378 B2 * | 11/2003 | Baker | 43/131 |
| 6,655,079 B1 * | 12/2003 | Bernard et al. | 43/131 |
| 6,665,979 B1 * | 12/2003 | Hsu | 43/107 |
| 6,681,518 B2 * | 1/2004 | Aesch et al. | 43/132.1 |
| 6,708,443 B2 * | 3/2004 | Hall | 43/107 |
| 6,874,274 B2 * | 4/2005 | Townsend | 43/131 |
| 6,886,293 B2 * | 5/2005 | Forehand | 43/107 |
| 6,920,716 B2 * | 7/2005 | Kollars et al. | 43/107 |
| 6,990,768 B1 * | 1/2006 | Boston | 43/132.1 |
| 7,051,474 B1 * | 5/2006 | Tesh | 43/132.1 |
| 7,073,287 B2 * | 7/2006 | Lau | 43/107 |
| 7,134,238 B2 * | 11/2006 | Forehand | 43/107 |
| 7,165,354 B1 * | 1/2007 | Rickenbacker | 43/131 |
| 7,204,054 B2 * | 4/2007 | Mayo et al. | 43/131 |
| 7,281,350 B2 * | 10/2007 | Wilbanks | 43/107 |
| 2005/0081428 A1 | 4/2005 | Ramsey et al. | 43/132.1 |
| 2005/0210735 A1 * | 9/2005 | Harmer et al. | 43/107 |
| 2005/0274061 A1 * | 12/2005 | Zhu | 43/107 |
| 2006/0086037 A1 * | 4/2006 | Roberts | 43/107 |
| 2006/0090391 A1 * | 5/2006 | Huang | 43/107 |
| 2006/0162235 A1 * | 7/2006 | Shih et al. | 43/107 |
| 2006/0248782 A1 * | 11/2006 | Dancy | 43/107 |
| 2007/0074447 A1 * | 4/2007 | Kalogroulis | 43/107 |
| 2007/0144056 A1 * | 6/2007 | Gleason | 43/107 |
| 2007/0214711 A1 * | 9/2007 | Mignot | 43/107 |

FOREIGN PATENT DOCUMENTS

| | | | |
|---|---|---|---|
| BR | 9901950 A * | 1/2001 | |
| BR | 200210313 A * | 8/2004 | |
| FR | 2897509 A1 * | 8/2007 | |
| GB | 2410668 A * | 8/2005 | |
| GB | 2418589 A * | 4/2006 | |
| JP | 1273534 A * | 11/1989 | |
| JP | 05103571 A * | 4/1993 | |
| JP | 06000046 A * | 1/1994 | |
| JP | 07203821 A * | 8/1995 | |
| JP | 8154553 A * | 6/1996 | |
| JP | 10146145 A * | 6/1998 | |
| JP | 2000189030 A * | 7/2000 | |
| JP | 2003061541 A * | 3/2003 | |
| JP | 2003144031 A * | 5/2003 | |
| JP | 2005087199 A * | 4/2005 | |
| JP | 2006067966 A * | 3/2006 | |
| JP | 2006223276 A * | 8/2006 | |
| JP | 2007236359 A * | 9/2007 | |
| WO | WO 3007710 A1 * | 1/2003 | |
| WO | WO 2004034783 A2 * | 4/2004 | |
| WO | WO 2006/126235 A1 * | 11/2006 | |
| WO | WO 2007032745 A1 * | 3/2007 | |
| WO | WO 2007073591 A2 * | 7/2007 | |

* cited by examiner

continued

NO MAINTENANCE LETHAL MOSQUITO BREEDING TRAP

CROSS-REFERENCE TO RELATED APPLICATIONS

This application claims the benefit of provisional patent application Ser. No. 60/646,123, filed Jan. 11, 2005 by the present inventor.

STATEMENT REGARDING FEDERALLY SPONSORED RESEARCH AND DEVELOPMENT

Not Applicable

SEQUENCE LISTING OR PROGRAM

Not Applicable

BACKGROUND OF THE INVENTION

1. Field of the Invention

This invention relates to a mosquito trap for controlling infectious disease carrying insects (vectors) and other mosquitos that cause irritations and specifically to a low cost trap that requires no periodic maintenance.

2. Discussion of Prior Art

The mosquito is a bane to humans and animals alike. It is a nuisance, a pest, an irritation and a deadly disease carrying killer. Some of the approximately 2700 varieties of this curse are the carriers of Dengue Fever, Malaria, West Nile Virus, and Encephalitis. The mosquito is found in every climatized corner of the globe and the deadly vector varieties put almost half of the world population at risk of infection every year. The mosquito also is a food source for birds, bats, frogs and fish, to name a few, and is an integral part of the circle of life.

Most methods used for controlling this insect, such as aerial spraying, and fogging, also eliminate many beneficial insects such as honey bees and butterflies or a variety of insects that are food sources for animals throughout the food chain, thus interrupting the natural order. By treating areas where mosquitos breed, recently developed larvicides and insecticides have achieved much greater specificity in eliminating the targeted species with little or no effect on non targeted insects.

Because of the serious consequences inflicted on human beings by these disease carrying insects, huge research and development efforts aimed at controlling their populations have been, and continue to be, carried on throughout the world. These efforts, that seek to find a weakness in the armor of this formidable adversary run the gamut from gene alteration to motorized suction fans with carbon dioxide attractants. Some of these devices try to exploit the fact that most of these creatures, and in particular the dengue, malaria, and west nile virus vectors, require a water source for incubating eggs. Since much is known about the breeding habits of these species and attempts have been made, most recently as described in U.S. Pat. Nos. 6,389,740 and 5,983,557, both entitled *Lethal Mosquito Breeding Container*, and both authored by Perich et al and dated May 2002 and November 1999 respectively, to attract the gravid female to these sites where they or their litter or both would be eliminated. Indeed, a controlled field study (Field Evaluation of a Lethal Ovitrap Against Dengue Vectors in Brazil; *Medical and Veterinary Entomology*, Volume 17, issue 2 page 205-June 2003, Perich et al), proved that a field deployed mosquito trap could compete successfully with other available incubating sources in the field. Although the design of the trap used in this study, as well as all others before them, have some of the attributes of the ideal mosquito trap ie: low cost, efficacy, specificity to mosquitos, and low environmental impact, they have two negative attributes which limits their use to mere scientific experimentation: 1) they require periodic maintenance to replenish fluid levels, larvicide/insecticide concentrations, etc. and 2) if not maintained properly or if the container is overlooked, once the initial larvicide/insecticide dilutes or otherwise becomes ineffective, the container then becomes an incubator, producing more insects and creating exactly the opposite desired effect.

3. Objects and Advantages

The mosquito trap described in this application has all the advantages sought by others in the past in that it is low in cost, efficiently eliminates both the adult female and her offspring, is specific to mosquitos and is environmentally benign. In addition it overcomes the two major obstacles faced by all other mosquito traps since it requires no maintenance and at the end of its useful life it biodegrades and therefore cannot become a breeding container, making it an ideal candidate for widespread use by the general public. Accordingly, several objects and advantages of this invention are:

(a) To reduce the mortality rate of human beings because of infection from mosquito vectors carrying deadly diseases.

(b) To reduce human suffering from diseases carried by mosquitos.

(c) To reduce irritations caused by mosquito bites.

(d) To reduce the effects of environmentally harmful mosquito control practices.

Further objects and advantages will become apparent from the ensuing description and drawings.

DRAWINGS

Figures

DRAWINGS

Figure 1:
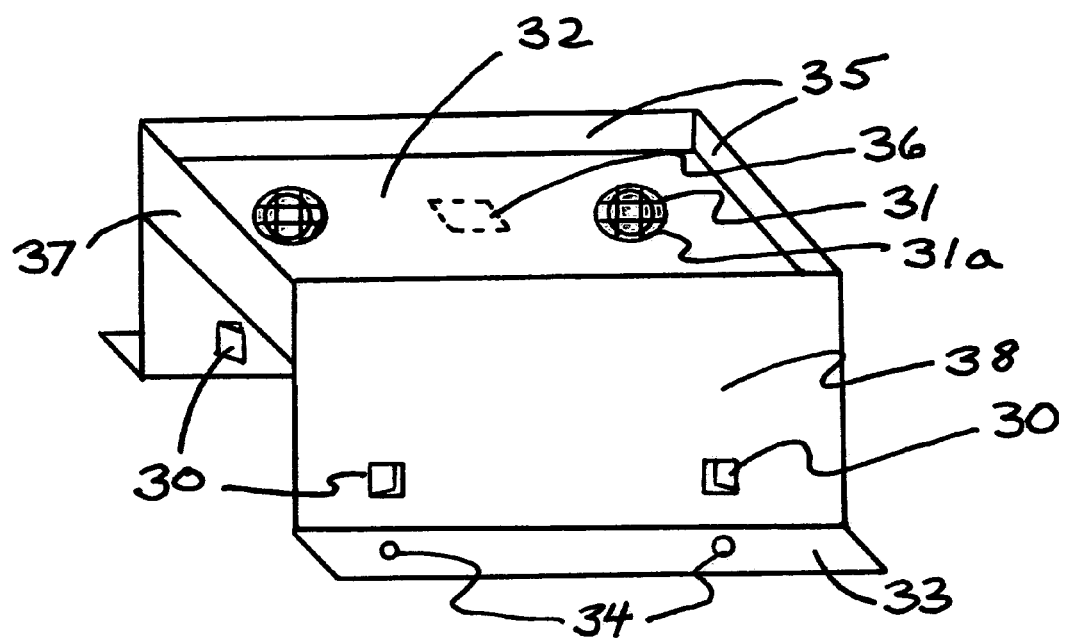
FIG. 1 shows a canopy with a water collecting basin with overhangs and drain(s) and side frames.

Reference numerals
  10 bottom
  14 bottom fastener perforation
  15 hold down spike
  20 water container
  21 high water outlet
  22 low side container
  24 high side container
  26 oviposition strata
  30 alignment tabs
  31 drain
  31a drain cover
  32 water collecting basin
  33 canopy hold down
  34 canopy perforation
  35 basin side walls
  36 alternate drain
  37 water collecting overhang
  38 canopy side frame

DETAILED DESCRIPTION

PREFERRED EMBODIMENT

The mosquito trap can be round, square, rectangular or even spherical. It can be made out of paper, paperboard, wood, gypsum, cellulose, composites, plastic, metal, fiberglass, or any other formable material. Since the preferred embodiment contemplated in this patent is that the device will be made from paperboard, and that it will be rectangular in shape, this is the example that will be used throughout this description. Although measurements are given for this preferred embodiment the reader should understand that the size of the trap can vary greatly and still be as effective as the one herein described.

Figure 2:
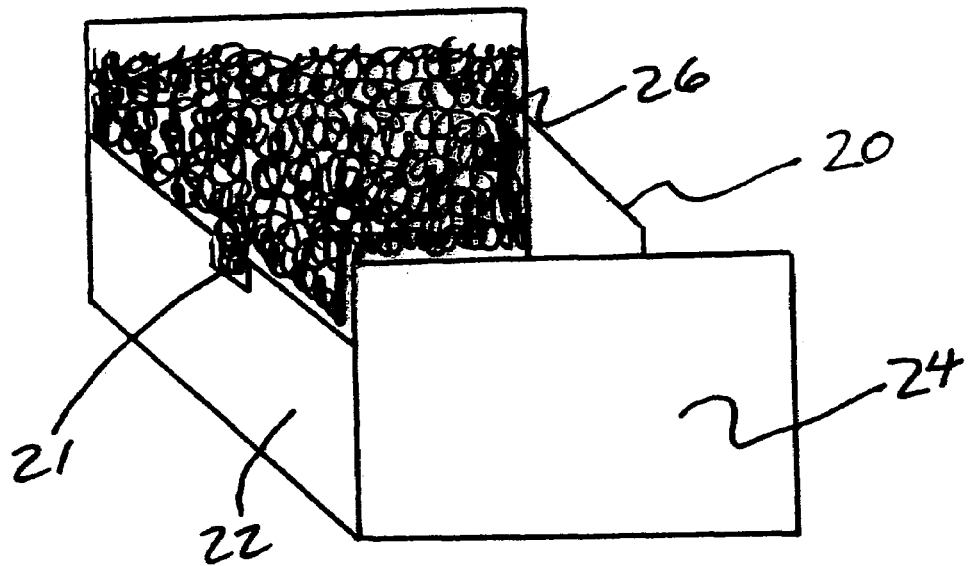
FIG. 2 shows a container with sides and a high water outlet.
Figure 3:
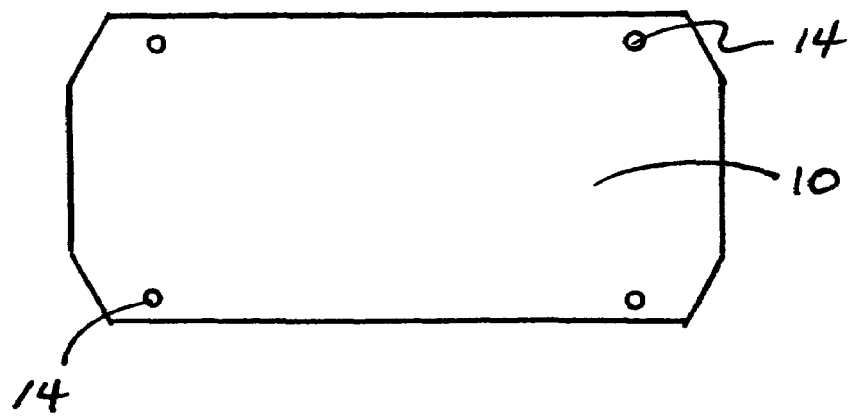
FIG. 3 shows a bottom with hold down perforations.

The trap is made up of three components: 1) the Top FIG. 1; the Water Container FIG. 2; and the Bottom FIG. 3. All three components are made from paperboard, a common material used extensively in the packaging industry and available with the specific characteristics needed to produce the individual result required by each product produced These characteristics include varying the thickness of the paperboard and varying the bonding agents used to hold the fibers together. In this case, since the trap is not intended to be used where it may contact a food source consumed by humans, the less expensive recycled paperboard, made from recycled paper, can be advantageously used. All exposed surfaces of paperboard used in this trap should be colored flat black on both sides. Polyethylene glycol is a waterproof coating used in the food packaging industry to keep liquids and other foods from leaching through their containers until they are consumed. Commonly referred to as "poly coating" many "Converters" or manufacturers that package products for end use can apply various formulas of poly coating to achieve a variety of results dictated by the particular requirements of each product. These include the use of coatings with different molecular weights, applying multiple layers of poly coating, or adding a variety of enzymes to the compound. The International Paper Corporation and Meade West Vaco are two of the many companies qualified to produce poly coated paperboard. In the present instance, the particular requirements for the material used in the trap is that they be designed to operate effectively for one entire mosquito breeding season, after which the mosquito trap should biodegrade and fail to hold water. Those skilled in the industry should specify a combination of paperboard and poly coating that will produce to this result.

FIG. 1 is the Canopy consisting of a Water Collecting Basin 32, which is 15 cm wide by 23 cm long and formed by elevated Basin Side Walls 35 which are 13 mm higher and completely surround Water Collecting Basin 32. Drain 31 are holes or perforations in basin 32 that direct water striking this surface to flow out either or both of these outlets. Drain Cover 31a is a water permeable sun shade such as filter paper or a sponge that allows water to flow through drain 31 but blocks any sunlight. Cover 31a is glued or otherwise fastened to basin 32. Alternate Drain 36 is placed at the center of basin 32. Canopy Side Frames 38 extend from the top of walls 35 to the Canopy Hold-Down Flap 33, a distance of 7.5 cm. Flap 33 is 25 mm wide and has 2 Canopy Fastener Perforations 34. Water Collecting Basin Overhang 37 extends 4 cm from top to bottom. Alignment Tabs 30 are formed by cutting three sides through frame 38 leaving the remaining side to act as a hinge which is bent inward at the four locations indicated 13 mm above flap 33.

Container FIG. 2, is 15 cm wide by 15 cm deep by 7.5 cm high at High Side Container 24 locations and 4 cm high at Low Side Container 22. High Water Outlet 21 is notched into the tops of sides 22 at their midpoint and measurers 13 mm by 13 mm.

The substrate preference upon which eggs are laid by gravid (pregnant) female *Aedes aegypti* mosquitos, the vector (carrier) for Dengue Fever, and one of the primary targets of this patent, has been documented in the literature. These and certain other troublesome mosquito vectors prefer a roughened surface such as that found on wood or a sponge or filter paper or a surface roughened with sandpaper, on which to deposit their eggs rather than a smooth surface such as plastic. The inside of side 24 offers an ideal location for placing such an Oviposition (egg laying location) Strata 26. Strata 26 should extend from the bottom of the container to well above the bottom of outlet 21, or a distance of 6 cm and can be glued or otherwise fastened in place. Strata 26 can be applied to one area of the inside of side 24 or to the entire inside area and may be made up of one or several different types of strata.

Bottom FIG. 3, is a flat member measuring 20.5 cm wide by 31.5 cm long. Bottom Fastener Perforations 14 are located at the four corners and are located below Canopy Fastener Perforations 34.

Figure 4:
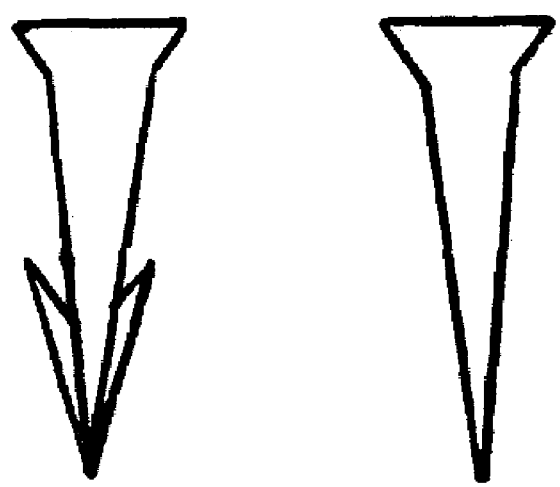
FIG. 4 shows two variations of a hold down spike.

Hold Down Spike FIG. 4, is a device of size and shape similar to a golfers tee and is used to penetrate through flap 33 and perforation 14 and into the ground when the trap is assembled and deployed in the field. This prevents the trap from moving or being blown away by the wind. The barbed configuration would make the spike more difficult to remove by vandals. If the device is located on a wooden surface, the spike can be replaced by a common thumb tack. If the device is placed on an impenetrable surface such as concrete, flap 33 should be glued to Bottom FIG. 3 and then the entire trap should be glued in place.

Figure 5:
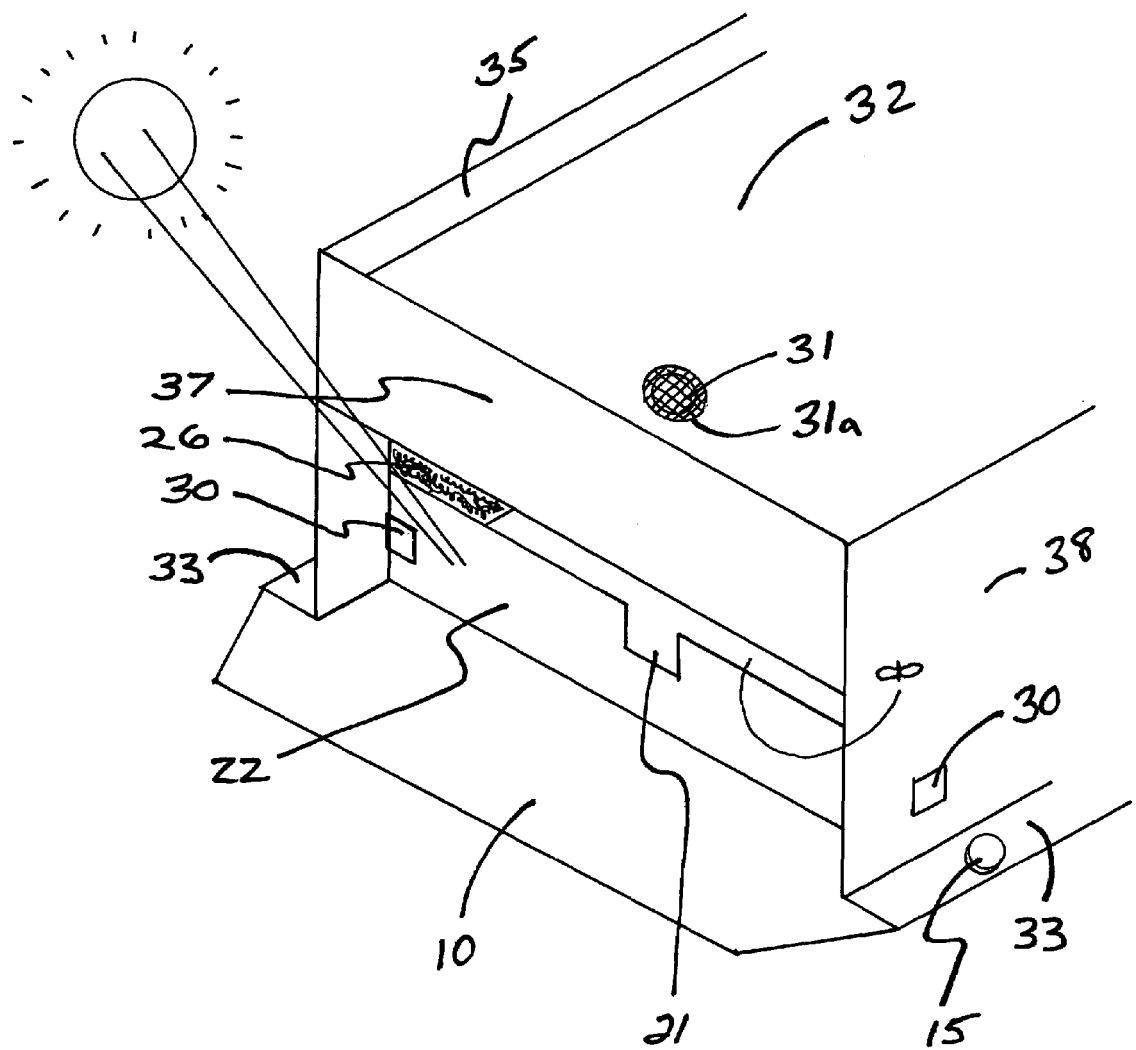
FIG. 5 shows an assembled trap with sun blocking ability.

The Trap Assembly FIG. 5, shows the three components assembled and installed in a normal outdoor configuration. Container FIG. 2 is placed on Bottom FIG. 3 and Canopy FIG. 1 is placed over the Container using tabs 30 to position the Container in the center of the Assembly assuring that outlets 21 are positioned directly under drains 31. Overhang 37 is now positioned to sufficiently shade the container and its contents from the sun and still allow free entry and egress for mosquitos to access the trap. Spike 15 is installed and pushed into the dirt pinning the trap in place.

Larvicides (compounds that kill insect larva before they mature), ovicides (compounds that kill the egg before hatching), insecticides, and insect growth regulators (compounds that disrupt the normal growth of insects) are chemical formulations used to eliminate mosquitos before they become disease bearing adults. These terms may be used interchangeably under the general term larvicides in this patent application. Altosid XR is an insect growth regulator with the active ingredient being Methoprene, and produced by Wellmark International. Pyriproxifen with the brand name Archer is available from the Syngenta Corporation. Spinosad is an ovicide with the brand names Tracer and Naturalyte and is available from the DowAgro Corporation. Because most larvicides are not specific to the target insect, they are capable of controlling beneficial insects, such as pollinators like butterflies and bees. For this reason the Environmental Protection Agency and other State Agencies strictly enforce protectionist legislation requiring manufacturers of these substances to adhere to strict environmental standards when selling and using these products. In most cases these standards require that any insecticide, and in particular those that are broadcast by aerial spraying in agra-business, break down quickly after application and do not persist in the environment. One of the primary ways this is accomplished is to select those compounds that are photo sensitive, or subject to degradation by sunlight. The mosquito trap described herein is not attractive to beneficial insects either as a food source or a breeding site. By placing minute quantities of larvicide in the trap (10 ppm) it becomes highly specific to container breeding mosquitos. The preferred larvicide for this trap, Spinosad, as well as most other suitable replacements, are photo sensitive. Therefore, in order to keep the initial charge of larvicide lethal throughout the life of the trap, Canopy FIG. 1, overhang 37, and cover 31*a* are designed to eliminate sunlight from entering container 20, thereby keeping the active ingredients of the larvicide from prematurely degrading. Spinosad, which has been shown to last over 200 days in environments simulated by this trap, is the preferred larvicide for use in this trap. Also, by varying the concentration in the initial solution, the time span during which the reservoir remains lethal can be increased or decreased. Those skilled in the art in this area should select the appropriate concentration that will achieve their desired results and comply with all legal regulations concerning use of this products.

Since some female mosquitos produce more than one clutch of eggs during their life span and other species such as *Aedes Aegypti* may deposit portions of a single egg cluster in several different containers, it is desirable to eliminate the adult female as well as her progeny. Because the female will often roost within the area she plans to lay her eggs and/or may rest at the same location after depositing her eggs, by coating the underside of basin 32 with an insecticide, it is possible to eliminate the female adult. An acceptable insecticide for this feature is permethrin. Permethrin is available from FMC Corp., or Syngenta Corp. under the trade names Ambush, Pounce, and Prelude.

Because this trap is black in color and close to the ground when deployed and charged with rain water, gravid female mosquitos will find and use it as a breeding site however, attractants or certain odors can amplify the gravid females desire to use the trap as a breeding site thus making the trap more productive than it would be without an attractant. In fact the *Culex quinquefasciatus* egg raft emits a pheromone that induces other females of the same species to deposit their eggs in the same location. Water from a hay infusion (water soaked in recently cut grass for several days) has long been known to be an attractant for certain gravid female mosquitos and this solution should be used as the initial charge for the trap herein described. Studies have identified the oviposition cue Skatole (3-methylindole) as an attractant for the West Nile Virus vector *Culex quinquefasciatus*. Although this compound is available for purchase from the Berje Corporation, it has not been reduced to a form that can be readily used in a mosquito trap to the knowledge of this investigator. Those skilled in the art are encouraged to reduce this compound to a controlled release formulation as an embellishment to this trap.

The preferred embodiment of this trap uses paperboard to form the structure of this device. Paperboard is produced from cellulose which can be a food source for insects and in particular, termites. Since this trap will be utilized in many parts of the world where termites are prevalent, the paperboard should be treated to prevent premature destruction of the trap. Ethylene glycol or common antifreeze is highly toxic to insects including termites. Wherever premature degradation of the trap by insects are a concern, the paperboard used to construct Bottom FIG. 3 and Canopy FIG. 1, as a minimum, should be treated with ethylene glycol.

Because the troublesome varieties of mosquitos mentioned throughout this specification will not deposit their eggs when the water temperature drops below 15 degrees C., in those areas of the world such as North America that experience cool or cold winter months for extended periods, the mosquito breeding season takes place during late Spring through early Autumn or approximately a five month period. In sub-tropical climates such as India, the mosquito breeding season takes place during and following the rainy or monsoon season and is depressed during the dry season or a minimum of six months. In tropical climates such as Indonesia, where mosquito vectors may breed throughout the year, the mosquito breeding season can be defined as those months where mosquito densities are above the threshold for increasing transmission, an approximately nine month period or, alternately, the entire calender year. In order for the trap to be maintenance free for an entire mosquito breeding season, the self imposed requirement of this patent application, the period of time over which the larvicide remains lethal must be equal to or longer than the time period when the container biodegrades, no longer capable of holding water, and this time period should be equal to or exceed the mosquito breeding season in that area of the world in which it is deployed. This is true regardless of the longevity of other embellishments to the trap such as the attractant, the adulticide, or the egg laying strata used. Therefore, those skilled in the art should design the variable components of paperboard and poly coating with the variable concentration of larvicide to construct the container to meet the requirements of the mosquito breeding season in which it is used.

Operation

In use, the lethal mosquito breeding trap is assembled as shown in FIG. 5 at the onset of the mosquito breeding season. First the Bottom FIG. 3 is laid on the ground in the out-of-doors, preferably in a shady area with little foot traffic and a clear path above for rainfall to strike the trap. Next the Water Container FIG. 2 is positioned in the center of the Bottom FIG. 3. Strata 26 can be installed in the container area at this time. After applying insecticide to the under side of basin 32, Canopy FIG. 3 is positioned over Water Container FIG. 2 and inside tabs 30 which have been bent inward. Now outlet 21 is perfectly positioned under drain 31 and perforations 14 are perfectly aligned with perforations 34. Hold Down Spikes FIG. 4 are now pushed through both perforations and into the ground securing the trap in place. Spinosad, is now added to the trap in an appropriate concentration. Hay infusion water is added to the trap until full. It can now be seen that, after the initial charge, any additional rain water entering the trap from drain 31 will first replace any water from the initial charge that may have evaporated and then begin to flow out outlet 21. By positioning drain 31 exactly over the outlet 21, rainwater entering the reservoir after the reservoir is full, will immediately flow out significantly limiting any flushing action on the larvicide remaining in the body of the reservoir. If Altosid XR briquets are used, which is a timed release formula that slowly dissolves in the presence of water, or any other similar timed release larvicide, Alternate Drain 36, which is located in the center of basin 32, may be used since dilution of the larvicide from flushing is a greatly reduced concern.

It can now be seen that the device is a maintenance free, lethal mosquito breeding trap. Rainfall will keep sufficient amounts of water in the trap to make it desirable for oviposition by gravid mosquitos. Because some mosquitos species including, *Aedes aegypti*, prefer to deposit their eggs on strata at or above the water line, it is not necessary that the container be full to be attractive for oviposition. As long as any discernable water is present in the trap, it will be an acceptable oviposition site for some vectors. Since Spinosad is not soluble, or only partially so, even if the trap were to completely dry out between rainfalls, the lethal properties will remain in the trap and then become re-suspended during the next rainfall. Sunlight cannot penetrate the water container thereby insuring the ability of the larvicide to remain lethal and control mosquito eggs throughout the breeding season.

Towards the end of the mosquito breeding season signs of biodegradation will appear. The poly coating will break down from ultra violet rays. The paperboard will also suffer from UV rays and the bonding medium in the paper will separate from constant soaking. Water will begin to leach out of the reservoir until it will no longer be capable of holding any water and the trap will no longer be functional and incapable of becoming an incubator.

Additional Embodiments

An alternate embodiment of the trap would be to manufacture it out of a reusable material such as plastic or to make the canopy and bottom out of reusable materials and the reservoir container biodegradable. In instances where the trap may be used by municipalities or country clubs or campuses and the like that have on staff full time maintenance personnel with established policies and procedures for deploying the traps at the onset of the mosquito breeding season and then collecting them when the season is over, there may be an economic advantage to paying a higher initial cost for a reusable trap than the accumulated cost of a single-use trap over many years. The single use costs of such a trap would be the larvicide, the adulticide, the attractant and possibly the egg laying strata.

Since some of these troublesome vectors use water filled tree holes to incubate their eggs, still another embodiment of this trap would be one similar in most respects to those described but with the ability to be mounted on a tree trunk.

Advantages

From the above description, a number of advantages of my mosquito trap become evident: At he beginning of the mosquito breeding season the trap is placed in a likely spot where mosquitos are likely to be found. No further tending or "maintenance" to check water levels, or the strength of the larvicide, or whether or not the household pet has lapped up the reservoir water is necessary since rainwater refills it, its anti flushing design and sunlight protections ensure the lethal properties remain intact, and animals cannot access the reservoir. The trap continues to function, attracting female mosquitos from the surrounding area and eliminating both the adult and her offspring without any periodic human intervention. Being highly specific to gravid female mosquitos, no beneficial insects are harmed. Used only in inhabited areas, bats and birds, toads and frogs, and other members of the insect and animal worlds in the wild that rely on the mosquito as a food source are unaffected by the operation of the trap. At the end of the mosquito breeding season the trap and its contents return to the earth leaving behind its legacy: lives saved, misery and human suffering reduced, and a higher quality of life for human beings. Accordingly, the reader will see that this no maintenance mosquito breeding trap will remove this concept from the scientific community and introduce it to world wide practical use.

CONCLUSION

Accordingly, although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

What I claim as my invention is:

1. A lethal mosquito breeding trap for use in the out-of-doors, in which gravid female mosquitoes enter to deposit eggs, where said gravid females and said eggs will be eliminated, said trap requiring no electrical power, said trap comprising:
   a canopy comprising:
      means for collecting rainwater, said means for collecting rainwater comprising:
         a water collecting basin at a top of said canopy, said water collecting basin being bounded by basin side walls which both extend upwardly from and along a periphery of said water collecting basin, and
         at least one drain hole extending through said water collecting basin,
      canopy side frames extending downwardly from some of said basin side walls which are located on opposing sides of said water collecting basin at first ends thereof, said canopy side frames defining an opening which is located both below said water collecting basin and between said canopy side frames, and said canopy side frames further comprising canopy hold down flaps at second ends thereof which extend transverse to said canopy side frames, and
      means for completely blocking sunlight from penetrating throughout a day;
   a container for holding the rainwater, said container comprising:
      means for allowing mosquitoes to enter therein, and
      means for allowing excess rainwater to flow out of said container;
   a bottom;
   a larvacide; and
   wherein when said canopy is placed on top of said bottom with said canopy hold down flaps on top of said bottom and when said container is placed within said opening and above said bottom, said container is engaged by means for aligning said container under said at least one drain hole on said canopy side frames, said at least one drain hole allows rainwater to flow from said water collecting basin into said container, said gravid mosquitoes are attracted to said container to deposit eggs therein, and said larvacide kills larva before they mature.

2. A lethal mosquito breeding trap as described in claim 1, wherein the trap further comprises means for fastening the trap in place on the ground.

3. A lethal mosquito breeding trap as described in claim 1, wherein the trap is constructed from a biodegradable material that functions throughout an entire mosquito breeding season maintenance free and which prevents the trap from converting to an incubator.

4. A lethal mosquito breeding trap as described in claim 3, wherein the biodegradable material is treated to prevent premature destruction by termites.

5. A lethal mosquito breeding trap as described in claim 1, wherein the larvacide further comprises means for limiting dilution of the larvacide by incoming rainwater.

* * * * *